(12) United States Patent
Fleischer et al.

(10) Patent No.: US 6,267,207 B1
(45) Date of Patent: Jul. 31, 2001

(54) APPARATUS FOR BRAKE ACTUATION

(75) Inventors: Horst Fleischer, Lauffen; Walter Titz, Auenwald, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/360,334

(22) Filed: Jul. 26, 1999

(30) Foreign Application Priority Data

Jul. 24, 1998 (DE) .............................................. 198 33 304

(51) Int. Cl.$^7$ ...................................................... B60L 7/00
(52) U.S. Cl. ...................... 188/162; 188/156; 188/106 P
(58) Field of Search ........................... 188/106 P, 106 L, 188/157, 156, 162

(56) References Cited

U.S. PATENT DOCUMENTS

| | | | | |
|---|---|---|---|---|
| 2,854,954 | * | 10/1958 | Howze | 188/106 F |
| 4,532,462 | * | 7/1985 | Washbourn et al. | 188/162 |
| 4,546,298 | * | 10/1985 | Wickham et al. | 188/162 |
| 4,809,824 | * | 3/1989 | Fargier et al. | 188/106 P |
| 5,219,049 | * | 6/1993 | Unterborn | 188/156 |
| 5,348,123 | * | 9/1994 | Takahashi et al. | 188/162 |

FOREIGN PATENT DOCUMENTS

| | | | |
|---|---|---|---|
| 621894 | 10/1935 | (DE) . | |
| 2546470 A1 | 4/1976 | (DE) . | |
| 2546470 | * | 4/1976 | (DE) ..................................... 188/262 |
| 2710585 C2 | 3/1977 | (DE) . | |
| 2714472 A1 | 10/1977 | (DE) . | |
| 2748540 B1 | 10/1977 | (DE) . | |
| 2828385 A1 | 1/1979 | (DE) . | |
| 3048766 A1 | 7/1982 | (DE) . | |
| 3344622 A1 | 6/1985 | (DE) . | |
| 3603145 A1 | 8/1987 | (DE) . | |
| 4403719 C1 | 2/1994 | (DE) . | |
| 4403719 | * | 8/1995 | (DE) ..................................... 188/262 |

* cited by examiner

Primary Examiner—Robert J. Oberleitner
Assistant Examiner—Devon Kramer
(74) Attorney, Agent, or Firm—Crowell & Moring, LLP

(57) ABSTRACT

An apparatus for actuating a brake of vehicles, in particular a parking brake, has an electric motor and a coupling element which is movement-coupled with the motor drive shaft of the latter, is linearly movable, can be connected to a brake tensioning mechanism and is transferred by the energized electric motor out of a braking position into a release position. A blocking device provides the block on movement of the coupling element, at least in the release position. A spring energy store is movement-coupled with the coupling element such that, in the release position of the coupling element, the store assumes a position to store spring energy, and when the block on movement is overridden, the coupling element is transferred into the braking position by the released spring energy. The blocking device is mechanically held in its blocking position, effecting the block on movement, and can be actuated electrically and optionally mechanically for overriding the block on movement in the release position of the coupling element.

21 Claims, 6 Drawing Sheets

APPARATUS FOR BRAKE ACTUATION

BACKGROUND OF THE INVENTION

This application claims the priority of 198 33 304.8-21, filed Jul. 24, 1998, the disclosure of which is expressly incorporated by reference herein.

The present invention relates to an apparatus for actuating a brake of vehicles, and more particularly, to a brake actuation apparatus having an electric motor and a coupling element which is coupled in terms of movement with the said electric motor, is linearly movable, can be connected to a brake tensioning mechanism and is transferred by the energized electric motor out of a braking position into a release position. An electrically actuated blocking device provides block on movement of the coupling element, at least in the release position. A spring energy store is movement coupled with the coupling element such that, in the release position of the coupling element, it assumes a storage position storing spring energy, and, when the block on movement is overridden, transfers the coupling element into the braking position by the released spring energy.

Apparatuses which, for actuating a brake, include an electric motor, a gear mechanism and a spring energy store are described in DE 25 46 470 A1; DE 27 10 585 C2; and DE 44 03 719 C1. In a release position of the known apparatus, not actuating the brake, the pre-loaded spring of the spring energy store assumes a position in which it stores spring energy. To maintain this release position, an electrically actuatable blocking device for the motor drive shaft or the gear mechanism is provided or the electric motor is supplied with a low holding voltage for its blocking. These known apparatuses have a disadvantage in that the spring energy store automatically relaxes if there is a power failure and the apparatus is consequently transferred into a braking position, thereby actuating the brake. This automatic braking operation may lead to considerable disturbances and safety risks in the operation of the vehicle.

A further apparatus for electronic brake actuation, disclosed in DE 30 48 766 A1, dispenses with a spring energy store for reaching the braking position. The braking position is achieved by a corresponding loading of the electric motor. In the event of a power failure, a shaft stub of the motor drive shaft must then be turned manually by a tool if braking is to be carried out. The driver finds this to be inconvenient. If this apparatus is used in a parking brake, a power failure makes it first necessary for the driver to leave a parked vehicle if he wishes to secure the vehicle by the parking brake. This necessity is either not possible at all, in particular on inclined carriageway surfaces, or entails considerable safety risks (risk of the vehicle rolling away) both to the driver and possibly other persons and to the vehicle.

SUMMARY OF THE INVENTION

An object of the present invention is to adapt the operating mode of an electric brake better to the functional requirements.

This object has been achieved by further providing that the blocking device is mechanically held in its blocking position, effecting the block on movement, and can be actuated electrically and optionally mechanically, for overriding the block on movement in the release position of the coupling element.

According to the present invention, the blocking device is mechanically held in its blocking position, effecting the block on movement, and can be actuated electrically, and optionally mechanically, for overriding the block on movement in the release position of the coupling element. In other words, the coupling element is mechanically blocked in the release position by corresponding blocking apparatus of the blocking device. The blocking device thus acts without electric current, i.e. independently of the electrical energy supply. Therefore, the blocking device remains effective even after a power failure or in the event of a defect of control electronics connected to the apparatus.

Consequently, undesired braking operations during driving caused by power failure or electrical defect are reliably avoided. By virtue of the additional (and when there is power, optional) mechanical actuating possibility of the blocking device, an automatic braking operation induced by power failure is also not required. In the event of a power failure, only wanted braking operations are possible in that the block on movement is overridden by mechanical actuation (for example manual) of the blocking device or its mechanical blocking apparatus. Thereafter, the braking operation takes place automatically by the released spring energy of the spring energy store. To summarize, a braking operation can be triggered electrically, and optionally mechanically, when the power supply is available, whereas a mechanical (emergency) triggering of the braking operation by the vehicle driver is possible after a power failure.

When the electrical energy supply for the blocking device is available again, the mechanical actuation of the blocking device can be replaced by an electrical actuation, in which an electrical signal or electrical energy is converted into a force acting on the blocking device, in order to remove its mechanical blocking means from the blocking position. An electrical switching device, which is coupled to the mechanical blocking apparatus via electrical lines (supply lines, control lines), switches (for example relays, overload switches etc.) and, if appropriate, further components, is preferably provided in the passenger compartment or the driver's cab of the vehicle for the electrical actuation.

Even if, when power is available, the blocking device can be mechanically actuated in the release position of the coupling element, the driver will normally choose the electrical actuation of the blocking device because of the greater operating convenience. The mechanical actuation or triggering of the braking operation is intended in particular for emergencies, e.g., power failure.

The block on movement when there is a power failure is preferably overridden manually from the driver's seat, which is particularly convenient for the driver. For a high level of safety, the driver also does not have to leave the vehicle if in the event of a power failure he wishes to override the mechanical blocking action of the blocking device. As a result, the securing of a vehicle, in particular on inclined carriageways, is particularly simple and safe by way of the apparatus according to the invention used in a parking brake.

In order in the event of a power failure to transfer the coupling element from the braking position into the release position, a suitable, manually actuatable release device or a tool must be available to act correspondingly on the coupling element. A braking operation triggered mechanically after a power failure is therefore a one-off event and the braking position is retained on account of the relaxed spring energy store if the abovementioned release device or the tool is not available. Consequently, in the event of a power failure, which often indicates an emergency, the vehicle can be reliably parked and secured.

The electric motor is, for example, a linear motor or motor with a motor drive shaft. Also within the scope of the present invention are electrically operated ultrasonic or travelling-wave motors. In any event, the electric motor is suitably coupled in terms of movement with the coupling element such that the coupling element can be driven in a linearly movable manner.

A reversible overriding of the block on movement can be provided, i.e. the block on movement can be restored. As a result, a renewed block on movement of the coupling element can be achieved when the braking operation is concluded. The blocking device preferably automatically resumes its blocking position; blocking the coupling element, when the electrical or mechanical actuation of the blocking device is ended. This advantageously takes place by a mechanical returning device, e.g., a spring element, acting on the blocking device.

The blocking device can have a movable blocking element as a mechanical blocking apparatus, which overrides the block on movement by way of an external force application. Such configurations can be implemented in technical production terms in a simple and robust form, so that even defined functional positions of the blocking device are ensured. For example, the blocking element is configured as a linearly movable blocking slide.

The force securing the blocking position may be partially or completely an external force acting on the blocking element by suitable structure (e.g., the returning device). The dead weight of the blocking element may also secure the blocking position.

A particularly space-saving way of arranging the blocking element is also contemplated and described below.

Likewise, a simple design and favorable force transfer during the blocking of the motor drive shaft can be provided in the manner disclosed herein. In this way, the blocking element can block the motor drive shaft directly or indirectly.

A stable construction of the blocking device with the aid of a blocking mechanism is achieved. The blocking mechanism is preferably a toothed ratchet or ratchet-and-pawl mechanism. The blocking of the motor drive shaft may be effective in one or both directions of rotation. The blocking mechanism is in this respect correspondingly designed as required. For the apparatus to work in an operationally dependent way, at least that direction of rotation of the motor drive shaft in which the coupling element would be transferred in the direction of the braking position is preferably blocked. In this way, unwanted braking operations in the event of a power failure are avoided particularly dependently.

A mechanically stable interaction of the blocking element and motor drive shaft is ensured. This in turn helps the apparatus to operate with low wear and a long service life.

Advantageous measures are further provided to actuate or control the apparatus electrically when power is available. In this case, an electromagnet, e.g., a lifting magnet mechanically coupled with the blocking element is electrically activated, so that the blocking element forcibly leaves its blocking position and the electric motor can adjust the coupling element. The electromagnet and the electric motor are preferably supplied with electrical energy by actuation of a switching device, e.g., manual actuation of a rocker or a rotary knob. In this embodiment, the electromagnet and the electric motor may be activated approximately simultaneously by the changing of a single switching state. This electric brake or parking brake can be operated particularly conveniently by a switching device arranged in the dashboard area of the vehicle. By renewed operation of the switching device (ending of the electrical energy supply), the driver himself determines the new position of the electric brake.

A space-saving arrangement of the electromagnet and blocking element as well as a favorable force transfer between these components is achieved and described herein.

To be able to trigger a braking operation even in the event of a power failure, a transfer apparatus is coupled with the blocking device and permits a convenient manual actuation of the blocking device from a location remote from the position of the blocking device, e.g., the driver's seat in the vehicle. According to the application, the transfer apparatus is realized by suitable components such as, a linkage and/or pull cable.

The present invention permits a construction of an uncomplicated design of the apparatus to actuate the blocking device both electrically and mechanically in the release position of the coupling element.

The mechanical actuation of the blocking device is further simplified in that the blocking device is coupled with a suitable actuating member via the transfer device. In particular, the actuating member is actuated by the physical force of the driver. The actuating member, preferably arranged in the area of the driver's seat, is configured in this case, for example, as a handle, handbrake lever or foot pedal.

Advantageous measures are also provided to drive the coupling element in a mechanically stable manner by way of a motor drive shaft. To minimize the weight of the apparatus, the gear wheels of the transmission gear mechanism may be produced from plastic and/or have clearances which cause the wall thickness of the gear wheels to be less in certain portions. The spindle drive may, according to the given spatial conditions and required force transmission, interact with a toothed gear mechanism or some other gear mechanism.

The apparatus can be of a modular construction, whereby servicing and repair work can be carried out particularly easily from an installation viewpoint. It is also within the scope of the present invention for only the defective components themselves to be exchanged and the remaining components to continue to be used in keeping with low-cost repair.

To simplify the installation of the individual housing parts of the apparatus, contact-bearings can be arranged on the housing parts and can correspond with one another. The contact-bearings act as a fixing aid and ensure an exact-fitting installation of the apparatus even by unskilled persons.

A mechanically stable configuration of the contact-bearing structure is contemplated. This stable configuration helps the apparatus to be assembled without damage and to be held together in a stable manner after installation.

The contact-bearing structure may be separately produced and firmly connected to the respective housing part thereafter, by, e.g., welding, soldering, etc. Alternatively, the contact-bearing structure is from the outset an integral element of the housing part during its production.

A pot-like shaping of at least one housing part favors the fitting of the apparatus in space conditions for which allowance is already made in vehicles for conventional devices, e.g., diaphragm cylinders, spring energy store cylinders, combination brake cylinders and the like. Thereby, retrofitting of the apparatus in an already existing brake system is simplified.

A construction of the apparatus of the present invention with partially prefabricated components available on the market at low cost is further contemplated. Parts of a conventional pneumatic brake cylinder, in particular sub-housings of the cylinder, spring energy store, piston rod, can be economically used for the apparatus according to the present invention.

Brake cylinders with a multi-part housing are known, for example, from DE 28 28 385 A1; DE 33 44 622 A1; and DE 36 03 145 A1. In such a brake cylinder, firstly the cylinder cover bearing the pneumatic connecting piece and possibly the diaphragm are removed. Thereafter, the first housing part, which fixes the blocking device and advantageously also the electric motor and possibly even the transmission gear mechanism, is brought to bear against the remaining housing part of the brake cylinder in the manner of the cylinder cover and is releasably fixed.

Design adaptations for force-related coupling between the piston rod, effective as the coupling element, and the electric motor are in this case scarcely required or not required at all. The piston rod is, for example, pushed by a linear motor in the direction of the release position. If a motor drive shaft is used, a rotationally fixed connection between the spindle drive and the piston rod is, for example, already achieved by the rotationally fixedly driven spindle or spindle nut being brought to bear with an end face approximately flush against the piston or the axial end of the piston rod.

The foregoing measure also has the advantage that the apparatus can at any time be converted easily from an installation viewpoint and at low cost from pneumatic drive to electric drive and vice versa, because individual parts of the apparatus are exchangeable on the modular principle. In other words, even at a later time, a pneumatic brake can be "transformed" into an electric brake, and vice versa, with relatively little effort. For example, vehicles exist in which there are no pneumatic functions apart from a pneumatic parking brake. In such case, the parking brake is particularly expensive because of the necessary compressor, pressure regulator, air dryer, air reservoir etc. Costing considerably less here is an electric actuation of the parking brake, which is therefore converted as described above. In the event that an electric parking brake is installed in the vehicle and further functions are actuated by pneumatic drive, it may be less costly for the parking brake also to be pneumatically actuated. The parking brake is then simply converted to pneumatic drive in the above described way, in that the housing part fixing the electric motor is removed and replaced by a cylinder cover with a pneumatic connecting piece.

The apparatus is advantageously an integral element of an electric parking brake for a vehicle, two apparatuses, for one wheel brake respectively, being preferably provided on the rear axle of a two-axle vehicle.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
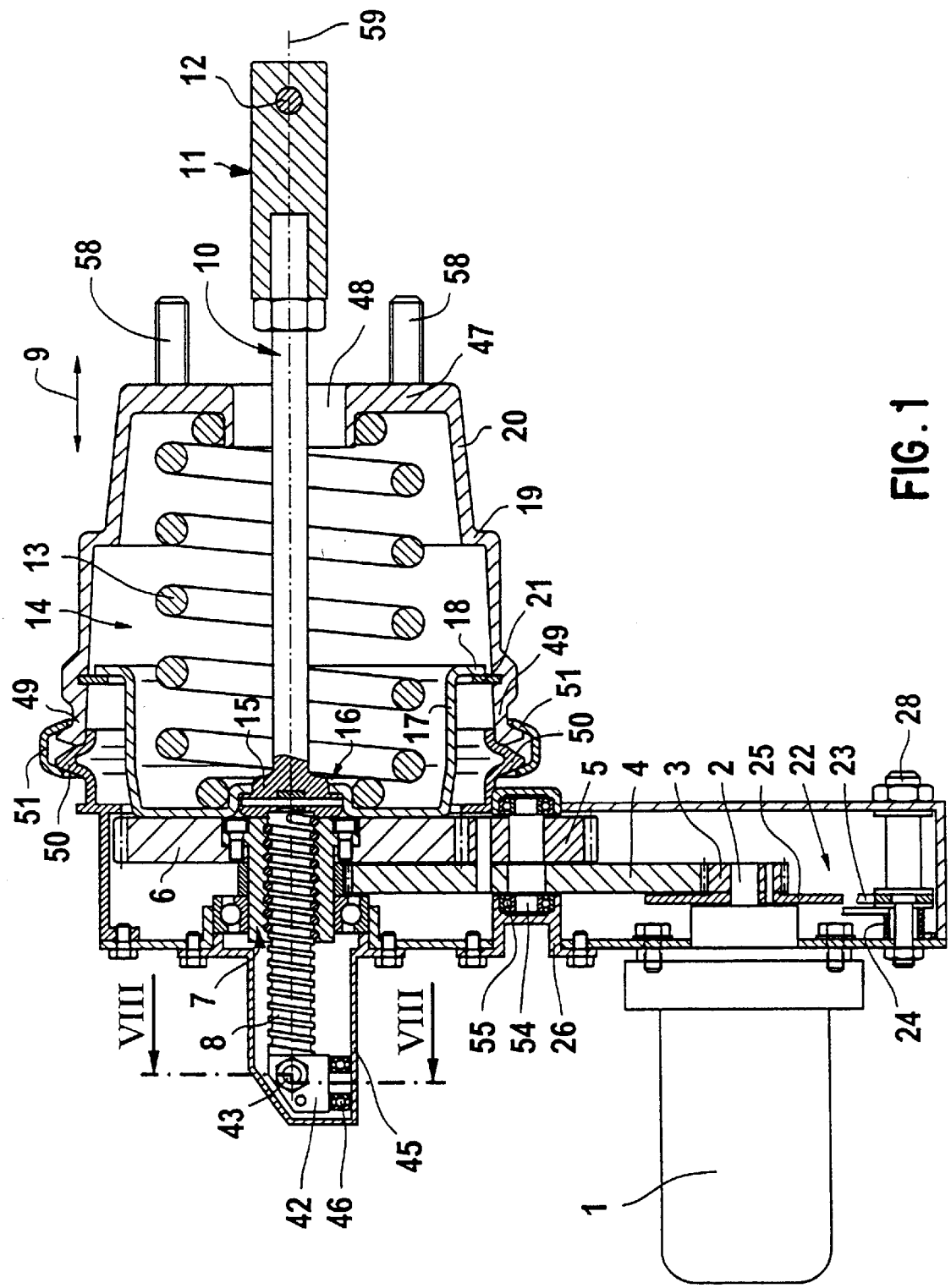
FIG. 1 is a sectional side view of the apparatus of the present invention in the braking position, along line I—I in FIG. 3.

In FIG. 1, the apparatus is shown in its braking position, actuating a wheel brake. The apparatus has an electric motor 1 with a motor drive shaft 2. The motor drive shaft 2 is connected in a rotationally fixed manner to a first gear wheel 3 of a reduction gear mechanism. The reduction gear mechanism includes a total of four gear wheels, a second gear wheel 4 being connected in a rotationally fixed manner to a third gear wheel 5 and the fourth gear wheel 6 being connected in a rotationally fixed manner to the spindle nut 7 of a spindle drive. A spindle 8, corresponding with the spindle nut 7, is linearly movable in the direction of movement 9 of a piston-rod coupling element 10. The coupling element 10 bears at its free end, lying axially opposite the spindle 8, a fork head 11 with two bearing eyelets 12, aligned with one another transversely to the plane of the sheet of the drawing, for the articulation of a generally known brake tensioning mechanism.

Figure 2:
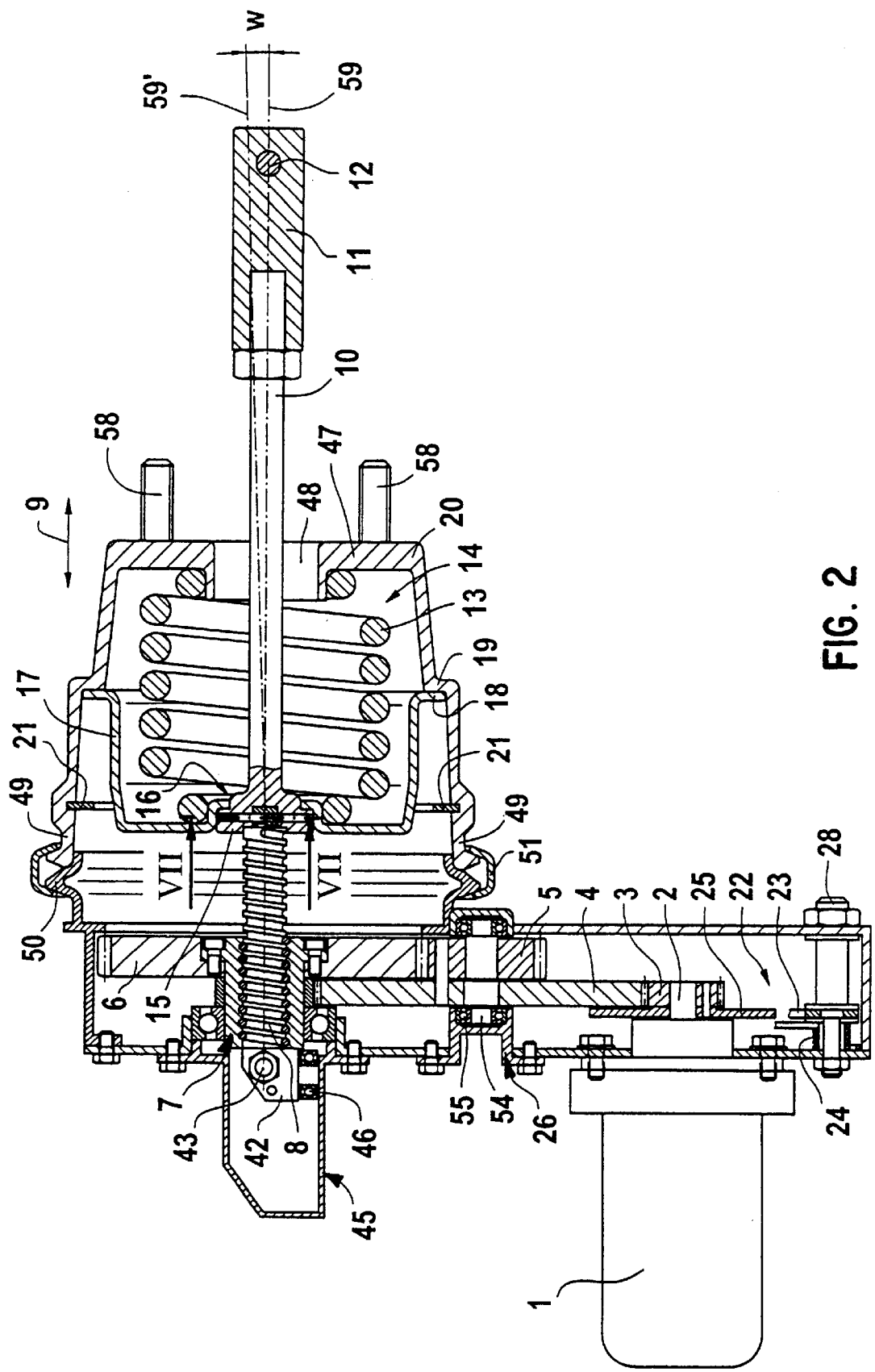
FIG. 2 is a view of the apparatus similar to FIG. 1 but in the release position.

An electric switch overrides a block on movement on the motor drive shaft 2 and energizes the electric motor 1, so that the coupling element 10 is transferred from its braking position, activating the brake via the brake tensioning mechanism, according to FIG. 1, into its release position according to FIG. 2. In this case, the driving force of the electric motor 1 must overcome the spring force of the compression spring 13 of a spring energy store 14.

The coupling element 10 is coupled in terms of movement with the compression spring 13, in that a rod head 15 of the coupling element 10 is supported on the opening rim of a central piston opening 16 of a pot-like piston 17. At the same time, one axial spring end of the compression spring 13 is supported on the piston 17. In the release position of the coupling element 10, the spring energy store 14 therefore assumes a storage position in which spring energy is stored. At the same time, the piston 17 is supported with a piston rim 18 on a shoulder-like limiting stop 19, which is an integral element of a second housing part 20, interacting with a first housing part 26. A further compression of the compression spring 13 is prevented by the limiting stop 19. The compression spring 13 is held in this storage position by the block on movement.

When the power supply is available, the block on movement in the release position of the coupling element 10 can be overridden by the electric switch and alternatively manually, i.e. mechanically. In the event of a power failure, the block on movement can then only be overridden manually. The compression spring 13 can then relax and transfers the coupling element 10 automatically into its braking position according to FIG. 1.

When power is available, this braking operation can also be assisted by energizing the electric motor 1 with a corresponding drive of the motor drive shaft 2. A further relaxation of the compression spring 13 is prevented by a limiting ridge 21, arranged on the housing part 20, when the piston rim 18 is bearing against the limiting ridge 21. The limiting ridge is configured preferably in an annular form or as a radially expandable spreading ring. In a further embodiment contemplated by the present invention, the piston rim 18 is positioned at a distance from the limiting ridge 21, even in the braking position. This reliably ensures that the brake tensioning mechanism is fully tensioned in the braking position, that is to say a maximum blocking action on the wheel brake is obtained. A further relaxation of the compression spring 13 is then prevented by the brake tensioning mechanism.

Figure 3:
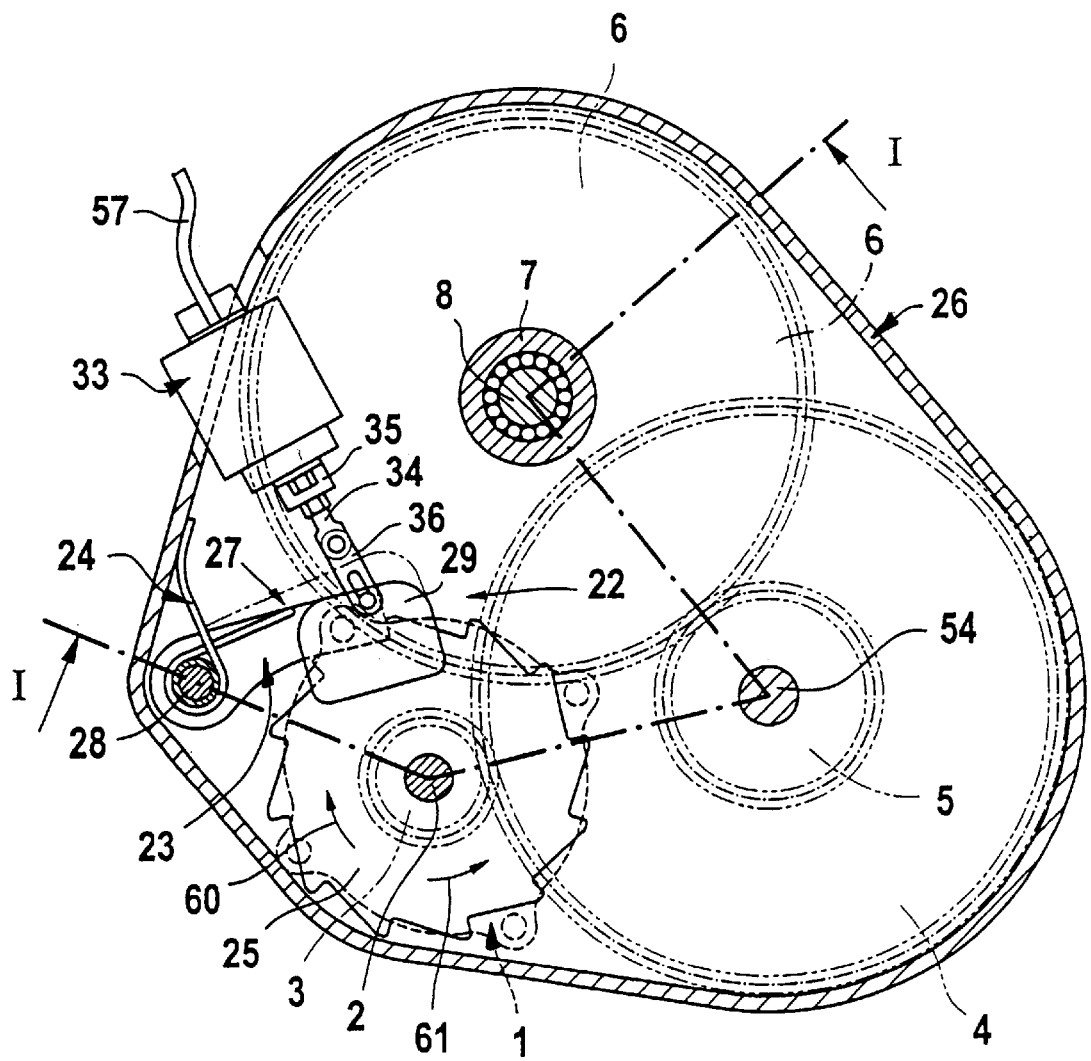
FIG. 3 is a partially sectioned plan view of the apparatus of FIGS. 1 and 2.
Figure 4:
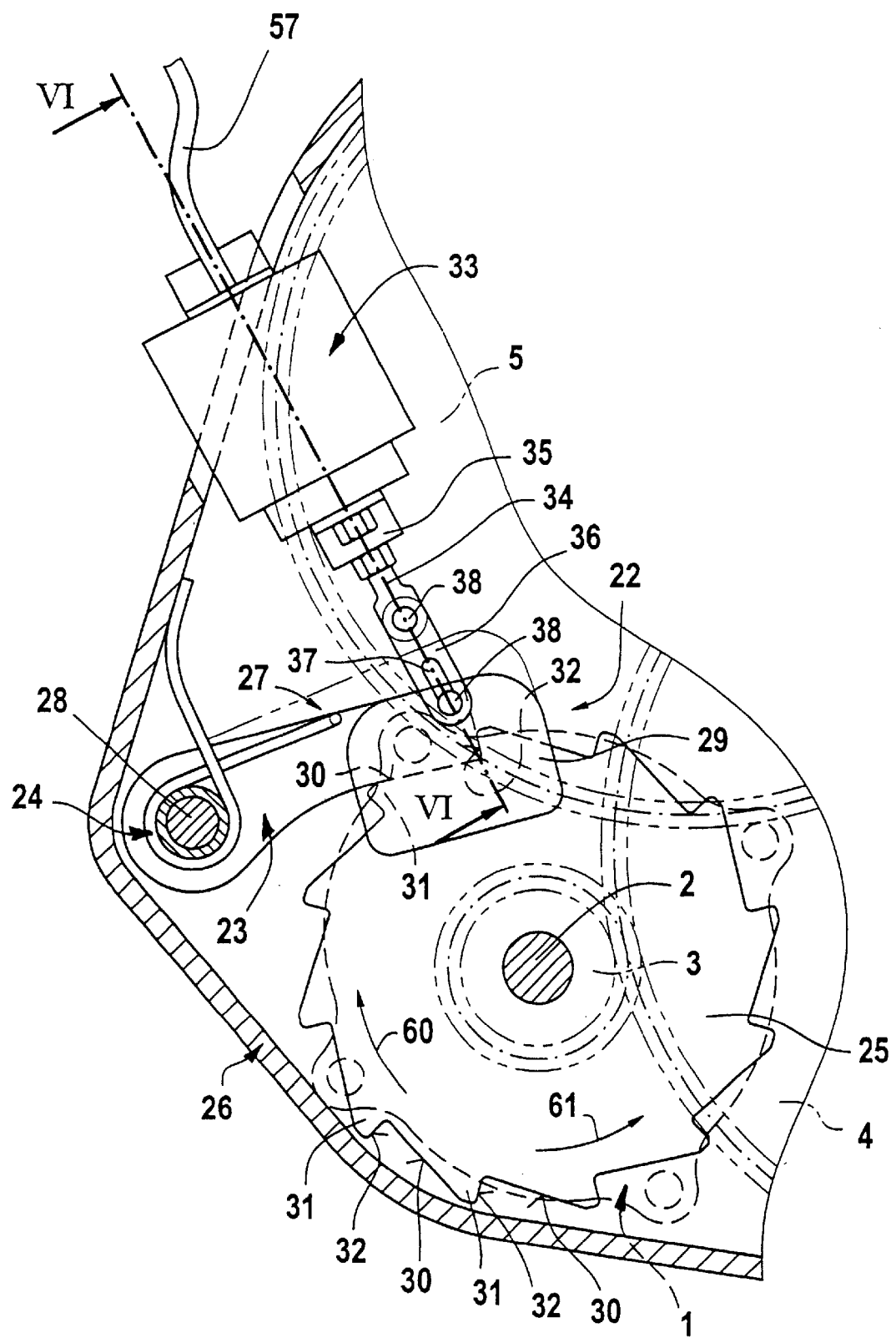
FIG. 4 is an enlarged detail view of the apparatus of FIG. 3.

The mechanical block on movement takes place by a blocking device 22, which includes a blocking element in the form of a swivel-movable blocking pawl 23, as can be seen in FIGS. 3 and 4. There, because of the spring force or returning force of a torsion spring 24, the blocking pawl 23 is in its blocking position, i.e. in engagement with a radially externally toothed blocking wheel 25. One leg of the torsion spring 24 is supported on a housing part 26 of the apparatus, while the other leg lies with its bent-away free end in a pawl groove 27 of the blocking pawl 23. The blocking pawl 23 and the torsion spring 24 are mounted on an axle bolt 28, which is fixed immovably on the housing part 26.

The blocking pawl 23 is covered transversely with respect to its swivelling plane on each of both sides by a plate-shaped cantilever guide 29. The two identically configured cantilever guides 29 are firmly connected to the blocking pawl 23 and positioned at a distance from one another such that, in the blocking position of the blocking pawl 23, they form a tangent to the blocking wheel 25 with motional play. As can best be seen in FIG. 4, in the blocking position the blocking pawl 23 bears flush against the rear flank 30 of a blocking tooth 31 of the blocking wheel 25 and flush against the front flank 32 of the neighboring blocking tooth 31.

Figure 6:
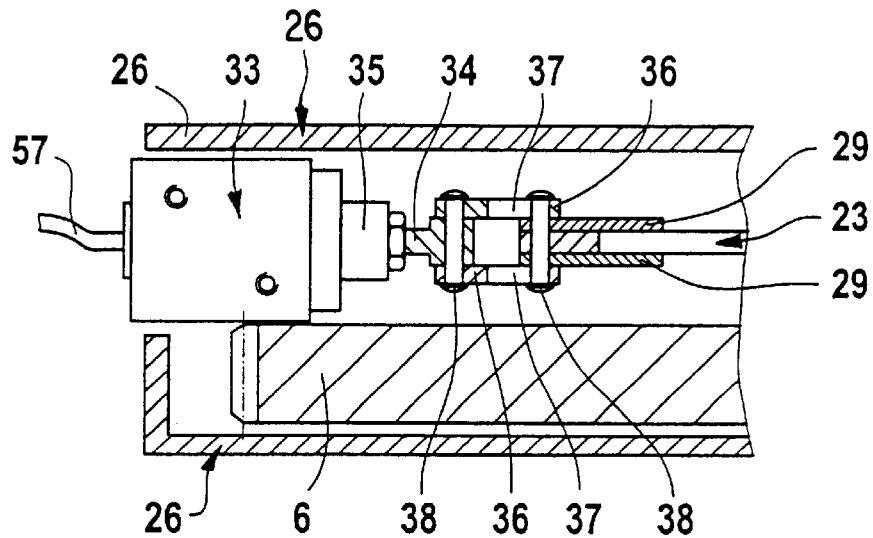
FIG. 6 is a sectional detail view of along line VI—VI in FIG. 4.

The blocking pawl 23 is mechanically coupled to an electromagnet, i.e. a lifting magnet 33, and at the same time is movably connected to an articulated arm 34 as seen in FIG. 6. The articulated arm 34 is in turn firmly connected to a magnet armature 35. The articulated arm 34 bears two oppositely arranged connecting plates 36 through which a slot 37 passes. The slots 37 serve for the motional guidance of a fixing rivet 38, connecting the cantilever guides 29 to the blocking pawl 23. In addition, the slots 37 permit a hindrance-free mobility between blocking pawl 23 and lifting magnet 33 during operation. A further fixing rivet 38 fixes the connecting plates 36 on the articulated arm 34. The connecting plates 36 may either be firmly connected to the articulated arm 34 or, for improved relative mobility between magnet armature 35 and blocking pawl 23, be connected in a swivelling-movable manner.

Figure 7:
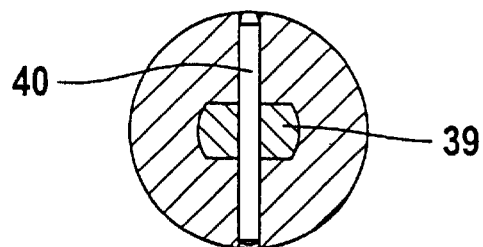
FIG. 7 is a sectional view of a detail along line VII—VII in FIG. 2.
Figure 8:
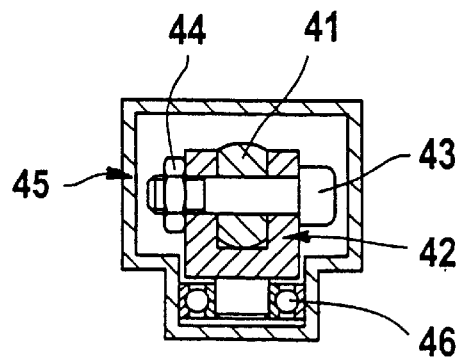
FIG. 8 is a sectional detailed view of along line VIII—VIII in FIG. 1.

The axial end of the spindle 8 which faces the rod head 15 bears a spindle stub 39. The latter engages approximately flush in a correspondingly shaped recess of the rod head 15 (FIG. 7). A securing pin 40 passes through the spindle stub 39 and the rod head 15 and runs transversely with respect to the movement direction 9 shown by the double headed arrow in FIGS. 1 and 2. Thereby, a particularly secure mechanical coupling between coupling element 10 and spindle 8 is provided. Inadvertent decoupling is effectively prevented. Furthermore, the occurrence of a torque at the spindle 8 can be prevented (block on torque) by this coupling, without further measures, because the brake tensioning mechanism usually already suppresses rotational movements of the coupling element 10 about its center longitudinal axis 59.

In a further embodiment, the axial end or the spindle stub 39 of the spindle 8, facing the rod head 15, is rounded off. The convex side of the rounded-off portion bears against the rod head 15. This rounding off advantageously permits a movable coupling between the spindle 8 and the coupling element 10 such that swivelling movements of the coupling element 10 enforced by the brake tensioning mechanism are not transferred to the spindle 8. The spindle drive 7, 8 and the gear mechanism 2, 3, 4, 5, 6 are therefore protected particularly well against wear. A possible swivelling movement of the coupling element 10 is indicated in FIG. 2 by means of the centre longitudinal axis 59' offset by a swivelling angle w.

The end of the spindle 8 lying axially opposite the spindle stub 39 bears a bearing stub 41 which lies in a U-shaped spindle bearing 42. The U legs of the spindle bearing 42 and the bearing stub 41 are jointly passed through by a fixing screw 43 which corresponds with a fixing nut 44. The spindle bearing 42 lies in a housing compartment 45 which is carried by the first housing part 26. A supporting bearing 46 is arranged on the spindle bearing 42, in particular in the form of a ball bearing, supports the spindle 8 in the housing compartment 45 which spindle 8 is also relatively movable with respect to the housing compartment 45. This mounting of the spindle 8 ensures that the spindle 8 is driven in a rotationally fixed manner only in the movement direction. An additional rotationally fixed coupling between spindle 8 and coupling element 10 is then not absolutely necessary. Rather, a mechanically contacting bearing of the spindle 8 against the piston head 15 is adequate.

The first housing part 26 receives the reduction gear mechanism, the spindle drive and the motor drive shaft 2. Furthermore, the housing of the electric motor 1 is fixed immovably, i.e., screwed, on the first housing part 26 which, in turn, comprises a plurality of integral elements firmly connected to one another by screw connections.

The second housing part 20 is one subhousing of a conventional brake cylinder, in which the cylinder cover, and possibly the diaphragm, have been removed. The second housing part 20 is of a pot-like configuration, with a pot base 47 running transversely with respect to the movement direction and passed through centrally by a through-opening 48 for the coupling element 10. A pot collar 49, lying opposite the pot base 47 in the movement direction 9, acts as a contact-bearing for the flush bearing of the first housing part 26. For this purpose, the first housing part 26 bears an annularly continuous contact-bearing ring 50 which is flush against the inner side of the pot collar 49. The two housing parts 20, 26 are connected releasably to one another by a tensioning band or a tensioning clip 51. It is also contemplated that this tensioning device can originate from the conventional brake cylinder. For example, the two ends of the tensioning device can be connected releasably to one another by a screwed union. The apparatus is fastened on the vehicle in a way analogous to a conventional brake cylinder by means of two threaded bolts 58 fastened on the pot base 47.

Figure 5:
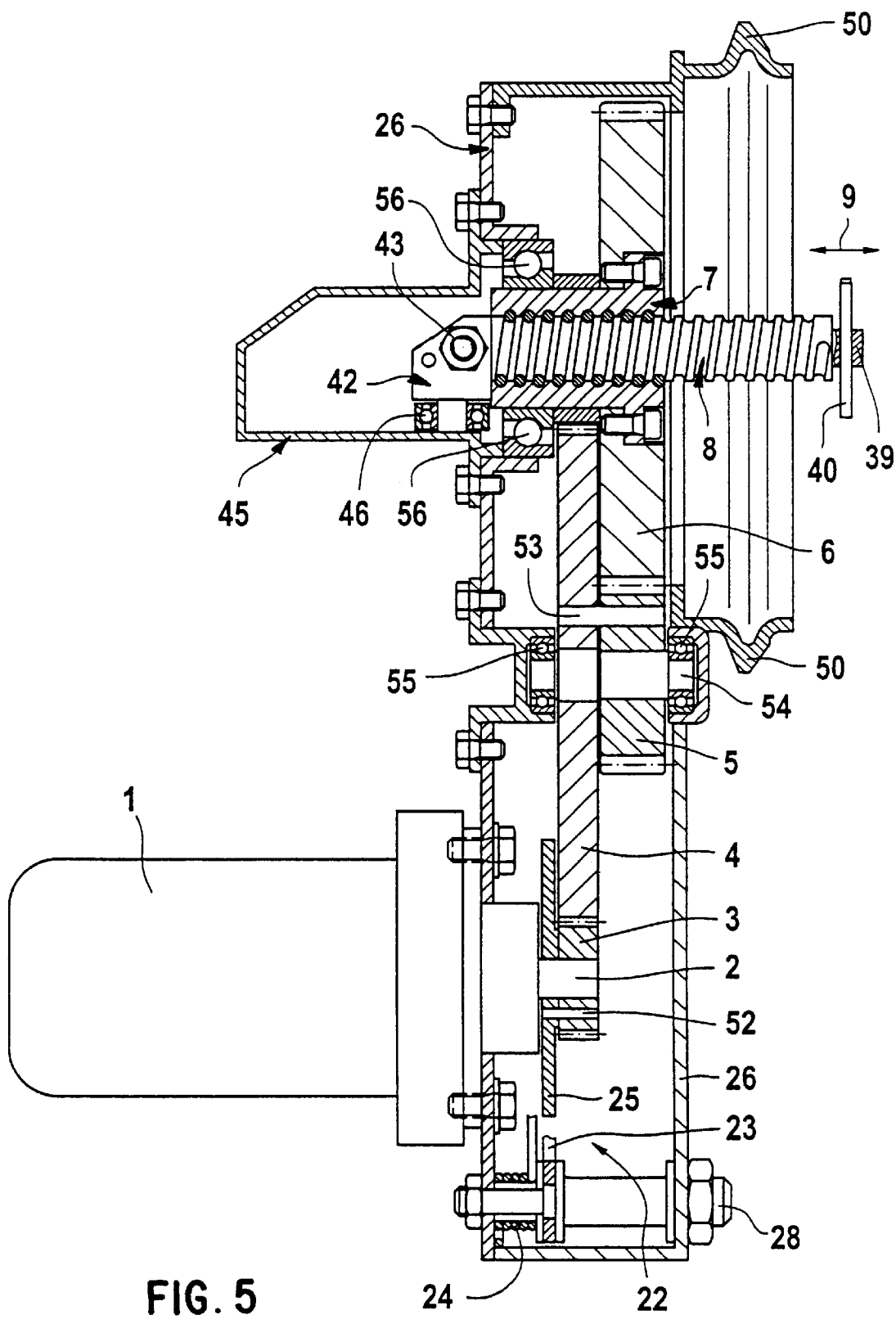
FIG. 5 is an enlarged partial view of the apparatus of FIGS. 1 and 2, but without the spring energy store.

As can be clearly seen in FIG. 5, the blocking wheel 25, the motor drive shaft 2 and the first gear wheel 3 are connected to one another in a rotationally fixed manner. The blocking wheel 25 and the first gear wheel 3 are connected by a rotationally securing pin or a plurality of rotationally securing pins indicated by a pin axis 52 of a rotationally securing pin. The pin axis 53 of a rotationally securing pin indicates the rotationally secured connection between a second gear wheel 4 and a third gear wheel 5. The two gear wheels 4, 5 are rotatably mounted on a grooved ball bearing 55 via a shaft 54. The spindle nut 7 is mounted in a stable manner in the first housing part 26 by an angular-contact ball bearing 56 and also by the spring force of the compression spring 13.

Starting from the braking position according to FIG. 1, when power is available the apparatus operates as follows. An electric switching device is actuated, so that the lifting magnet 33 (FIG. 3) is activated. The magnet armature 35 of the latter pulls the blocking pawl 33 out of the blocking position shown in FIGS. 3 and 4, by the generated magnetic force. The block on movement for the blocking wheel 25 is thereby reversibly overridden on account of the returning force of the torsion spring 24. That is, the block on movement is automatically restored by the spring force of the torsion spring 24 as soon as the lifting magnet 33 is deactivated. In addition, when the switching device is actuated as mentioned above, the electric motor 1 is energized, which then turns the blocking wheel 25 in the direction of rotation 60 (FIG. 4) and, as a result, drives the coupling element 10 in the release position direction shown in FIG. 2. The electric motor 1 and the lifting magnet 33 are automatically switched off by an overload switch or the like when the illustrated release position has been reached.

Starting from the braking position, driving of the coupling element 10 by the electric motor 1 is also possible when the lifting magnet 33 cannot remove the blocking pawl 23 from the blocking position, e.g. with an electrical or mechanical defect in the lifting magnet 33. This is because the blocking action of the blocking device 22 is provided only in the counter direction of rotation 61 due to the shaping of the blocking teeth 31. In the event that therefore no actuation of the blocking device 22 to remove the blocking pawl 23 from the blocking position takes place, the motor drive shaft 2 must be driven against the spring force of the torsion spring 24 in the direction of rotation 60. The slots 37 offer the advantage that the articulated arm 34 can remain in its deactivated position in FIG. 4 when the blocking pawl 23 is swivelled out of its blocking position by the blocking wheel 25 turning in the rotation direction 60. Mechanical damage to the blocking pawl 23 and lifting magnet 35 is thereby avoided.

For transferring the coupling element 10 out of its release position in FIG. 2 into its braking position in FIG. 1, due to the one-sided blocking action of the blocking device 22 in the counter rotation direction 61, the blocking pawl 23 must firstly be removed from the blocking position. For this purpose, when power is available, the electric switching device is actuated, whereupon the lifting magnet 33 is activated and the block on movement is overridden. At the same time, the electric motor 1 is then energized and the motor drive shaft 2 is then rotated in the counter rotation direction 61, so that the rotational movements of the transmission gear mechanism generated in any case by the relaxing compression spring 13 are assisted. When the braking position is reached, the lifting magnet 33 and the electric motor 1 are in turn automatically switched off by suitable means. In a further contemplated embodiment, only the lifting magnet 33 and consequently the blocking pawl 23 are electrically actuated for overriding the block on movement, without energization of the electric motor 1 taking place when the braking position is to be achieved. The compression spring 13 relaxes automatically on account of the non-self-locking configuration of the transmission gear mechanism.

Each time the lifting magnet 33 is switched off, a renewed block on movement automatically takes place for the coupling element 10 by the returning force of the torsion spring 24.

Starting from the release position of the coupling element 10, the following braking operation by mechanical actuation of the blocking device 22 is possible in the event of a power failure. Fastened on the magnet armature 35 is a transfer device in the form of a pull cable 57, which leads to the area of the driver's seat and is connected there to an actuating member (e.g., a handle) for the manual actuation of the magnet armature 35. The pulling on the actuating member replaces the electromagnetic attraction of the magnet armature 35 and leads in the same way to the overriding of the block on movement. The torsion spring 13 can therefore relax. The coupling element 10 is automatically transferred into the braking position corresponding to FIG. 1. After letting go of the actuating member, the blocking pawl 23 is transferred automatically once again into its blocking position on account of the returning force of the torsion spring 24. The braking position is mechanically locked.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for actuating a brake of a vehicle, comprising an electric motor; a coupling element operatively coupled movement-wise with the electric motor, linearly movable, connectable to a brake tensioning mechanism and transferrable by the electric motor in an energized state out of a braking position into a release position; an electrically actuated blocking device for a block on movement of the coupling element at least in the release position and having a spring energy store coupled movement-wise with the coupling element such that, in a release position of the coupling element, the store assumes a position to store spring energy, and, when the block on movement is overridden, the store transfers the coupling element into the braking position by released spring energy, wherein the blocking device is provided with means for mechanically holding the blocking device in a blocking position thereof, effecting the block on movement, and being electrically, and optionally mechanically, actuatable for overriding the block on movement in the release position of the coupling element.

2. The apparatus according to claim 1, wherein the blocking device comprises a means for returning into a blocking position.

3. The apparatus according to claim 1, wherein the blocking device has a movable blocking element which, in a blocking position thereof, blocks a movement of the coupling element and is moved out of the blocking position by electrical and optionally mechanical actuation.

4. The apparatus according to claim 3, wherein the blocking element is swivellably mounted on a swivel axis.

5. The apparatus according to claim 3, wherein, in the blocking position, the blocking element blockingly acts on a motor drive shaft.

6. The apparatus according to claim 1, wherein the blocking device is mechanically coupled with a moveable magnet armature of an electrically controlled electromagnet, the electrically generated magnetic force being effective in particular counter to the blocking position of the blocking device.

7. The apparatus according to claim 3, wherein the blocking device comprises magnet armature which has an articulated arm movably connected to the blocking element, with movements of the magnet armature being parallel to a plane of movement of the blocking element.

8. The apparatus according to claim 6, wherein the magnet armature has an articulated arm movably connected to the blocking element, with movements of the magnet armature being parallel to a plane of movement of the blocking element.

9. The apparatus according to claim 1, wherein the blocking device is mechanically coupled with a transfer means for mechanical actuation thereof.

10. The apparatus according to claim 9, wherein the transfer means is mechanically coupled with the movable magnet armature.

11. The apparatus according to claim 9, wherein an area of the transfer means facing away from the blocking device is mechanically coupled with a manually actuable actuating member.

12. The apparatus according to claim 1, wherein a housing is provided with a plurality of housing parts, which are at least partially releasably inter-connected.

13. The apparatus according to claim 5, wherein the motor drive shaft is coupled with the coupling element via a transmission gear mechanism which converts between rotary and linear movements.

14. The apparatus according to claim 13, wherein the transmission gear mechanism has a spindle drive and a toother gear mechanism operatively interacting with the spindle drive, a first part of the spindle drive being connected in a rotationally fixed manner to a gear wheel of the toothed gear mechanism and another part of the spindle drive being effectively rotationally fixed with the coupling element.

15. An apparatus for actuating a brake of a vehicle, comprising an electric motor; a coupling element operatively coupled movement-wise with the electric motor, linearly movable, connectable to a brake tensioning mechanism and transferrable by the electric motor in an energized state out of a braking position into a release position; an electrically actuated blocking device for a block on movement of the coupling element at least in the release position and having a spring energy store coupled movement-wise with the coupling element such that, in a release position of the coupling element, the store assumes a position to store spring energy, and, when the block on movement is overridden, the store transfers the coupling element into the braking position by released spring energy, wherein the blocking device is mechanically holdable in a blocking position thereof, effecting the block on movement, and is actuatable electrically, and optionally mechanically, actuatable for overriding the block on movement in the release position of the coupling element, wherein the blocking device has a movable blocking element which, in a blocking position thereof, blocks a movement of the coupling element and is moved out of the blocking position by electrical and optionally mechanical actuation, in the blocking position, the blocking element blockingly acts on a motor drive shaft, and wherein the blocking device has a blocking mechanism with a toothed blocking wheel connected in a rotationally fixed manner to the motor drive shaft, and a blocking pawl arranged to be brought into engagement with the blocking wheel to be effective as a blocking element.

16. The apparatus according to claim 15, wherein the blocking pawl is flanked transversely with respect to a plane of movement thereof on each side by a cantilever guide, the respective cantilever guide on each side being firmly connected to the blocking pawl and, positioned at a distance from one another, receiving the blocking wheel therebetween, at least in certain portions, in the blocking position.

17. An apparatus, for actuating a brake of a vehicle, comprising an electric motor; a coupling element operatively coupled movement-wise with the electric motor, linearly movable, connectable to a brake tensioning mechanism and transferrable by the electric motor in an energized state out of a braking position into a release position; an electrically actuated blocking device for a block on movement of the coupling element at least in the release position and having a spring energy store coupled movement-wise with the coupling element such that, in a release position of the coupling element, the store assumes a position to store spring energy, and, when the block on movement is overridden, the store transfers the coupling element into the braking position by released spring energy, wherein the blocking device is mechanically holdable in a blocking position thereof, effecting the block on movement, and is actuatable electrically, and optionally mechanically, actuatable for overriding the block on movement in the release position of the coupling element, wherein a housing is provided with a plurality of housing parts, which are at least partially releasably inter-connected, a first of the housing parts receives the blocking device and is releasably connected to a second of the housing parts receiving the spring energy store and the coupling element, whereby first and second housing parts bear against one another with mutually facing housing openings and have contact-bearing structures at a position of mutual bearing contact.

18. The apparatus according to claim 17, wherein at least one of the first and second housing part has an annularly continuous contact-bearing ring constituting the contact-bearing structure.

19. The apparatus according to claim 17, wherein the second housing part has a pot-like configuration with a pot base extending transversely with a direction of the coupling element with a through-opening for the coupling element and a pot collar facing away from the pot base to act as the contact-bearing structure, and a contact-bearing structure on the first housing part corresponds with the pot collar.

20. The apparatus according to claim 19, wherein the second housing part is a subhousing of a pneumatic brake cylinder which has a multi-part cylinder housing with releasably interconnected subhousings.

21. A parking brake system, comprising an electric motor; a coupling element operatively coupled movement-wise with the electric motor, linearly movable, connectable to a brake tensioning mechanism and transferrable by the electric motor in an energized state out of a braking position into a release position; an electrically actuated blocking device for a block on movement of the coupling element at least in the release position and having a spring energy store coupled movement-wise with the coupling element such that, in a release position of the coupling element, the store assumes a position to store spring energy and, when the block on movement is overridden, the store transfers the coupling element into the braking position by released spring energy, wherein the blocking device is provided with means for mechanically holding the blocking device in a blocking position thereof, effecting the block on movement, and being electrically, and optionally mechanically, actuatable for overriding the block on movement in the release position of the coupling element.

* * * * *